June 17, 1952 R. J. JAUCH ET AL 2,600,876

AIRPORT FUELING MECHANISM

Filed May 14, 1945 9 Sheets-Sheet 1

INVENTORS
Robert J. Jauch,
Sherwood Hinds,
Frederick W. Sturm,
BY Aikenson, Huxley, Byron & Knight
attys.

June 17, 1952 R. J. JAUCH ET AL 2,600,876

AIRPORT FUELING MECHANISM

Filed May 14, 1945 9 Sheets-Sheet 2

INVENTORS.
Robert J. Jauch,
BY Sherwood Hinds,
Frederick W. Sturm,
Wilkinson Huxley Byron & Knight
Attys June 17, 1952 R. J. JAUCH ET AL 2,600,876

AIRPORT FUELING MECHANISM

Filed May 14, 1945 9 Sheets-Sheet 3

INVENTORS.
Robert J. Jauch,
Sherwood Hinds,
Frederick W. Sturm,
BY Wilkinson, Huxley, Byron & Knight
attys.

June 17, 1952 R. J. JAUCH ET AL 2,600,876

AIRPORT FUELING MECHANISM

Filed May 14, 1945 9 Sheets-Sheet 4

INVENTORS.
Robert J. Jauch,
Sherwood Hinds,
BY Frederick W. Sturm,

Wilkinson, Huxley, Byron & Knight
attys.

June 17, 1952 R. J. JAUCH ET AL 2,600,876

AIRPORT FUELING MECHANISM

Filed May 14, 1945 9 Sheets-Sheet 5

INVENTORS.
Robert J. Jauch,
Sherwood Hinds,
BY Frederick W. Sturm,
Wilkinson, Huxley, Byron & Knight
attys.

INVENTORS.
Robert J. Jauch.
Sherwood Hinds,
BY Frederick W. Sturm,
Wilkinson, Huxley, Byron & Knight
Attys.

INVENTORS.
Robert J. Jauch,
Sherwood Hinds,
BY Frederick W. Sturm.
Wilkinson, Huxley
Byron v Knight
Attys June 17, 1952 R. J. JAUCH ET AL 2,600,876

AIRPORT FUELING MECHANISM

Filed May 14, 1945 9 Sheets-Sheet 8

INVENTORS.
Robert J. Jauch
Sherwood Hinds,
Frederick W. Sturm,
BY Wilkinson, Huxley, Byron & Knight
Attys.

June 17, 1952 R. J. JAUCH ET AL 2,600,876

AIRPORT FUELING MECHANISM

Filed May 14, 1945 9 Sheets-Sheet 9

INVENTORS
Robert J. Jauch,
Sherwood Hinds.
Frederick W. Sturm
BY
Wilkinson, Huxley, Byron & Knight
Attys.

Patented June 17, 1952

2,600,876

UNITED STATES PATENT OFFICE 2,600,876

AIRPORT FUELING MECHANISM

Robert J. Jauch, Fort Wayne, Sherwood Hinds, Columbia City, and Frederick W. Sturm, Fort Wayne, Ind., assignors to The Wayne Pump Company, Fort Wayne, Ind., a corporation of Maryland Application May 14, 1945, Serial No. 593,558

9 Claims. (Cl. 222—23)

This invention pertains to liquid dispensing apparatus and more particularly to mechanism and apparatus for fueling wherein high delivery can be effected and a long hose readily used and handled, making it readily adaptable for use as an airport fueling apparatus.

For a number of years the so-called fueling pit has been used extensively in airports. This pit system has a source of liquid supply in the form of an underground or overhead storage tank and, by means of a pump, usually located near the source of supply, gasoline under pressure is forced to the fueling pit which houses a meter, control valves, switches and a reel on which fifty or more feet of hose is coiled. To the end of the hose is attached a nozzle for controlling the flow of liquid to the plane. The usual practice is for the plane to taxi to a location at or near the fueling pit. The attendant then withdraws a sufficient length of hose to reach to the fill opening, usually on the top of the wing, and filling is then effected.

A hose containing gasoline under pressure is difficult to handle, not only by reason of the weight involved, but because it is difficult to control the shut-off nozzle when closing against the high pressure necessary to force gasoline through the dispensing system. A hose larger than 1½ inches in diameter becomes so unwieldy that it is almost impossible to handle, and since the hose size must be confined to diameters of 1½ inches or less, flow rates are greatly restricted and the objective of the air lines to obtain delivery of 100 g. p. m. upwards are not obtainable.

This pit system has a rather wide spread use in airports where planes, smaller than the transport type, are serviced. The commercial air lines have not taken kindly to fueling pits and prefer, instead, to fuel planes from a gasoline truck equipped with power take-off. This system has several advantages over the pit system. The plane can come to rest at any position on the field and the fueling truck is driven to the plane. The pump, which is driven by power take-off mechanism installed as a part of the equipment of the truck, forces gasoline through the meter, hose and nozzle, and by reason that the tank truck can be positioned rather closely to the plane, it is usually necessary to only withdraw about twenty-five feet of the hose from the reel, and since the pump is so closely associated with the source of supply, faster deliveries are obtained. The objection to this tank truck delivery is, of course, the limited capacity of the truck.

The commercial air lines, planning for the future, are endeavoring to improve the present fueling system. They visualize capacities of 150 g. p. m. as being necessary to quickly complete the fueling of large transport planes. It is obvious that extremely high pressures would result if attempts were made to force 150 g. p. m. through a hose of 1½ inch diameter, and as stated before, it has been found impractical to handle a hose in excess of that diameter. They object, also, to the hose being dragged over the wing of the plane and have considered the possibility of fueling from underneath the wing, making the system a bottom fueling, rather than a top fueling arrangement. Efforts to accomplish bottom fueling have, to date, met with failure, because the valve mechanism developed for insuring against any loss of fuel, after the connection has been broken, has resulted in so much intricate mechanisms as to be considered impractical.

The system described herein is designed to expedite the delivery of fuel to a plane, making it possible to deliver gasoline at a rate of at least 150 g. p. m. with less effort than it now takes to deliver gasoline at 40 g. p. m. It further contemplates the abandonment of the present fueling pit apparatus entirely and dispensing with the costly fueling truck. This is accomplished through the use of a flexible, collapsible hose which is expanded to its true diameter only while gasoline is being delivered to the plane, and which is collapsed to a flattened position with all gasoline withdrawn from the hose before the connection to the fill pipe of the plane is broken. The hose, meter, control valves, and air separator pump may be stored in a cabinet at a selected point or may be carried on a light, small, inexpensive vehicle.

In the herein disclosed system, a storage tank located remotely from the airport may be used, and this storage tank can be either above ground or can be buried underground. In either case, a pump of suitable capacity is positioned near the source of supply and lines are run to the landing field and branched out in several directions. To the ends of the various branches are affixed the control and dispensing apparatus for the particular branch, which apparatus is readily positioned and readily and easily operated, or the ends of the various branches may be provided with connections to which connections from dispensing apparatus on a vehicle may be coupled.

It is an object of this invention to provide fueling apparatus which is readily adapted to bottom fueling of a receptacle, such as the fuel tank of air airplane.

Another object of the invention is to provide fueling apparatus adapted for high delivery but one which is easily and readily handled and operated.

Another object of the invention is to provide fueling apparatus which may be used to supply fuel to airplanes or other vehicles, and may also be provided with means for withdrawing fuel from the tanks of the airplanes or other vehicles when this is found to be necessary.

Another object of the invention is to provide fueling apparatus wherein the delivery hose is exhausted of fuel after delivery, and is stored dry.

Another object of the invention is to provide fueling apparatus wherein the fueling and defueling, where necessary, is controlled at a point remote from the source of fuel supply.

Another object of the invention is to provide fueling apparatus wherein the delivery hose which is used may be of large diameter, but is moved and stored only in dry condition.

Another object of the invention is to provide fuel dispensing apparatus wherein a portion thereof is mobile for connection to various outlets.

Another object of the invention is to provide fuel dispensing apparatus wherein certain parts thereof are mobile so that a long disconnectable suction hose may be used and a relatively short discharge hose is provided which is readily handled.

Another object of the invention is to provide a fueling system, mobile or stationary, wherein the discharge hose is emptied for storing after a fueling operation, but the amount of liquid emptied from the system is not charged to fueling, so that always a true amount of fuel delivered is registered.

Another object of the invention is to provide a fueling system wherein certain controls thereof are automatic in operation.

Another object of the invention is to provide a fueling system wherein accurate registry is obtained whether or not a defueling operation is performed.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 12:
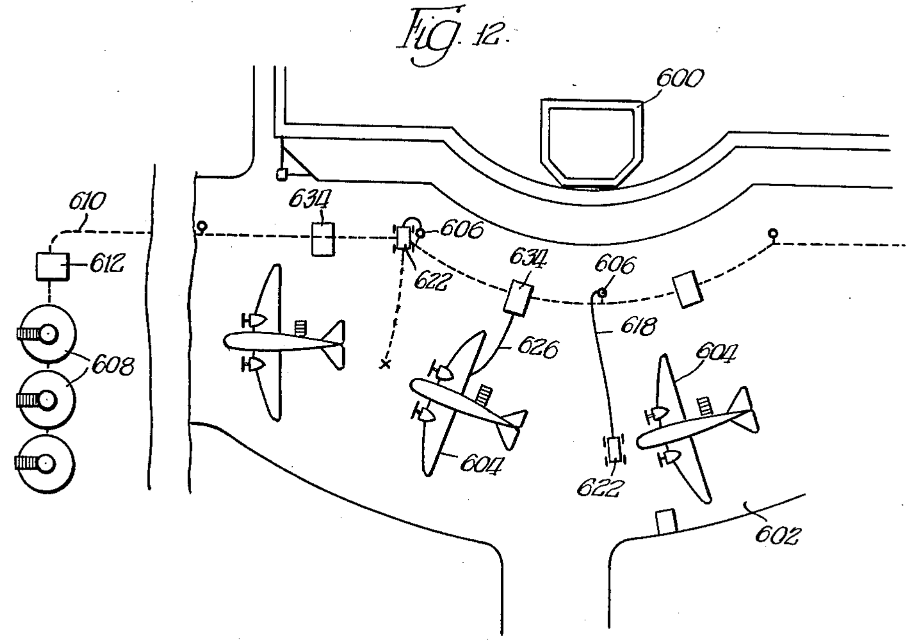
Figure 13:
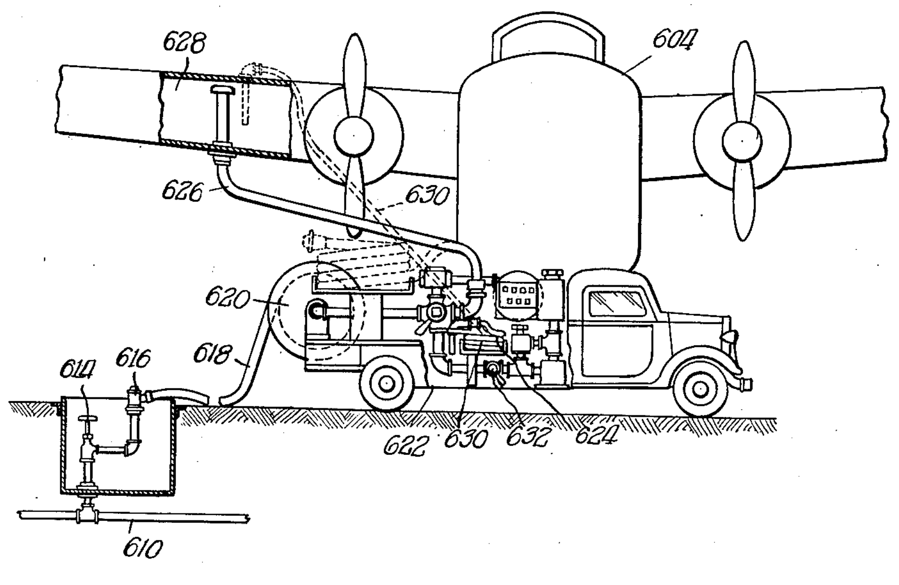

Figures 8 to 11 inclusive are modified forms of dispensing mechanism embodying the invention;

Figure 12 is a plan view, more or less diagrammatic, showing an airport with the fueling system embodying the invention; and Figure 13 is an elevation showing the fueling of a plane with a fueling system embodying the invention, a portion thereof being mounted on a vehicle.

Referring first of all, more particularly, to Figures 1 to 5 inclusive, a source of liquid supply is shown as an elevated tank 20, but it is, of course, understood that it may be an underground tank. The tank is connected through pipe 22 and shutoff valve 24 to the inlet side of pump 26. The outlet side of the pump is connected through piping 28 to various outlets 30 shown mounted in shallow pits 32. In a case of a landing field, these pits would be conveniently located.

Within the pits, the outlet comprises a suitable hand operated valve 34 provided with the arm 36, the arm 36 being provided with a suitable connection fitting 38 which may be in the form of a bayonet socket. Of course, a suitable cover (not shown) is provided for the various pits and a suitable switch 42 may be provided in each pit adapted to be conditioned to operate the pump 26. In order to provide for liquid to return to the tank 20, where back pressure occurs, to be later described, either the pump 26 is bypassed or a connection 44 is provided having a suitable check valve 46 provided therein opening toward tank 20.

The vehicle to be fueled is shown as the plane 48 provided with the fuel tank 50 which is of the bottom fill type such as shown in United States Patent No. 2,362,559, granted November 14, 1944. A bottom fitting 52 is provided communicating with the fill pipe 54 having at the top thereof a valve seat 55 and spider 56 (Figure 4), said seat being adapted to be closed by the valve 58, the valve having a stem 60 extending through the spider and being provided with the spring 62 urging the valve to closed position and the valve 58 may be provided with the suitable deflecting means 64.

In order to introduce fuel into the tank 50 from the selected pit, a land vehicle such as the automobile 66 is utilized, said automobile having a hose reel 68 rotatably mounted on suitable supports 70 and provided with a manifold 72 to which one end of the hose 74 is secured. The reel 68, on which the hose is mounted, may be provided with sheaves or guides for receiving the hose which may be maintained as a wet hose. The opposite end of the hose 74 is provided with the nozzle 76 within which is provided a combination manually operable or spring-loaded check valve operable as at 77. The end of the nozzle 76 is provided with the fitting 78 adapted for quick connection to the fitting 38 as through a bayonet socket connection. The vehicle is provided with dispensing means indicated generally by numeral 80 and in Figure 1 (and in the other modifications) the dispensing means is provided with the flexible, collapsible hose 82 having a coupling or fitting 84 adapted to be coupled to the fitting 52 for filling purposes. When top filling is to be used a suitable hand operated nozzle is used wherein release of the usual operating lever causes the nozzle valve to close.

Figures 1, 2:
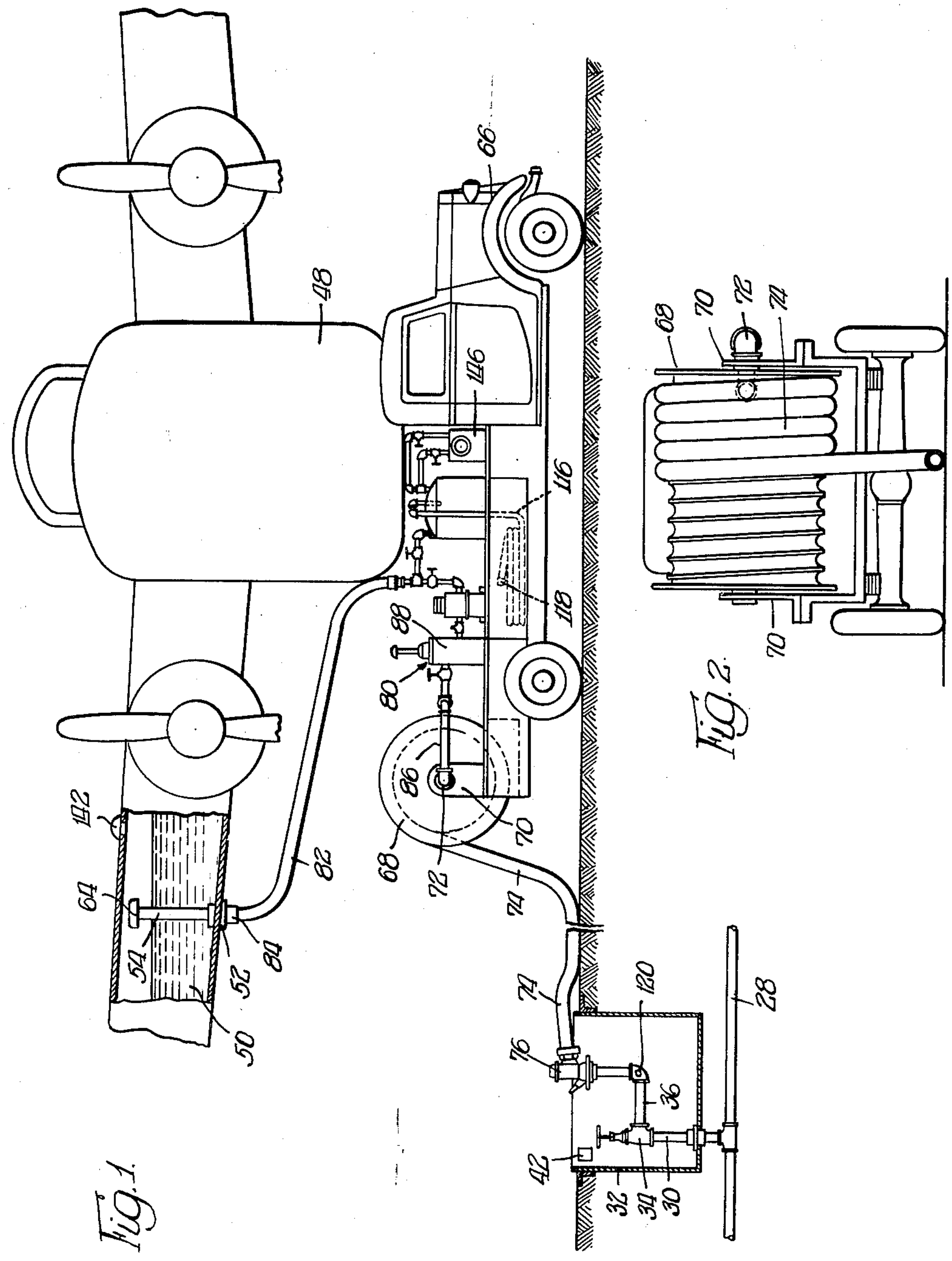
Figure 1 is an elevation showing dispensing apparatus mounted on a vehicle for supplying liquid from an underground source to another vehicle, the latter being specifically shown as an airplane.
Figure 2 is an end elevation of the vehicle on which the connection to the underground source is stored showing particularly the storage means therefor.
Figures 3, 4:
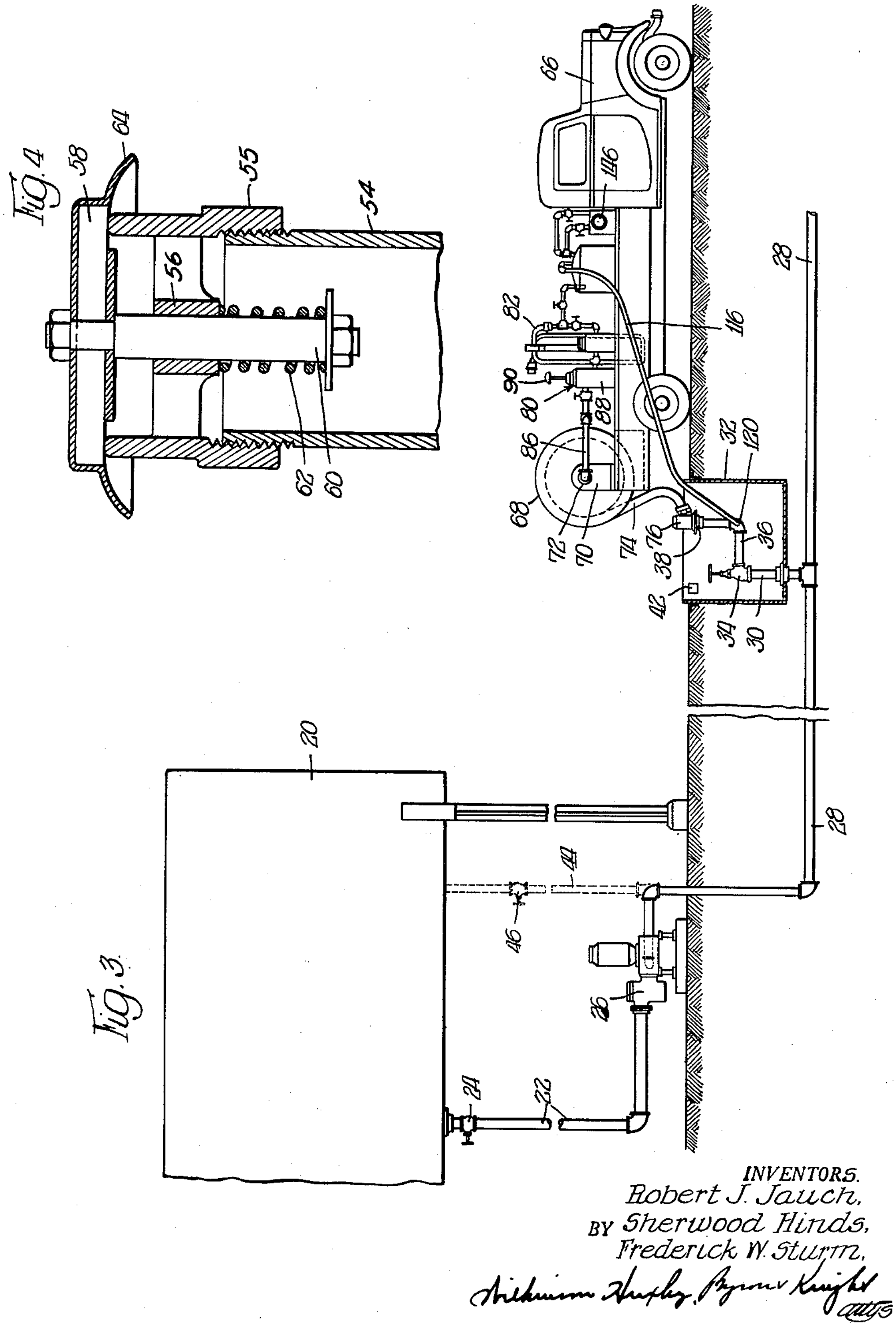
Figure 3 is an elevation corresponding to Figure 1 showing the vehicle in position after fueling for evacuating a portion of the underground connection prior to disconnecting the connection from the underground connection.
Figure 4 is an enlarged fragmentary sectional elevation showing the top check valve for the bottom fill pipe.
Figure 6:
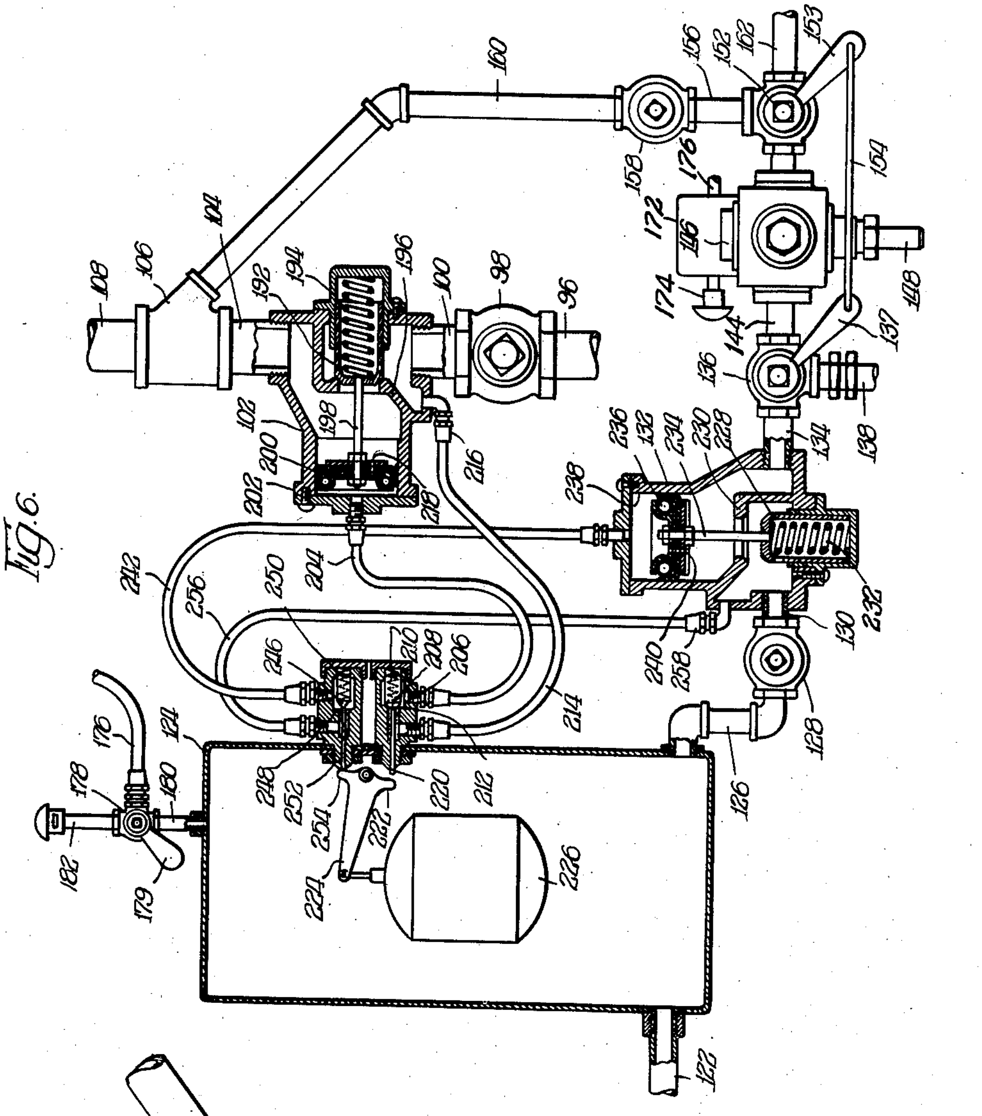
Figure 6 is a fragmentary elevation partly in section, showing the piping of another form of dispensing means which is mounted on the vehicle.
Figure 5:
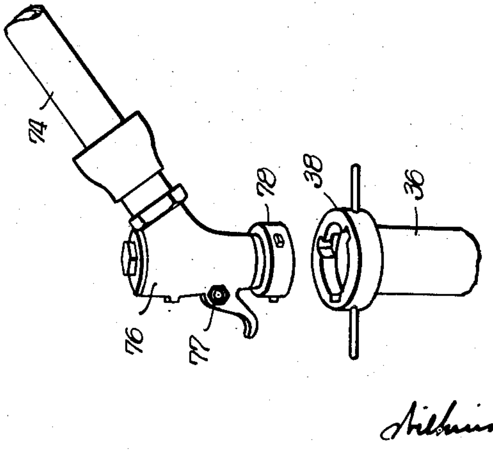
Figure 5 is a fragmentary perspective of a form of hose and pipe connection used in making the fixed outlet and hose connection.
Figure 7:
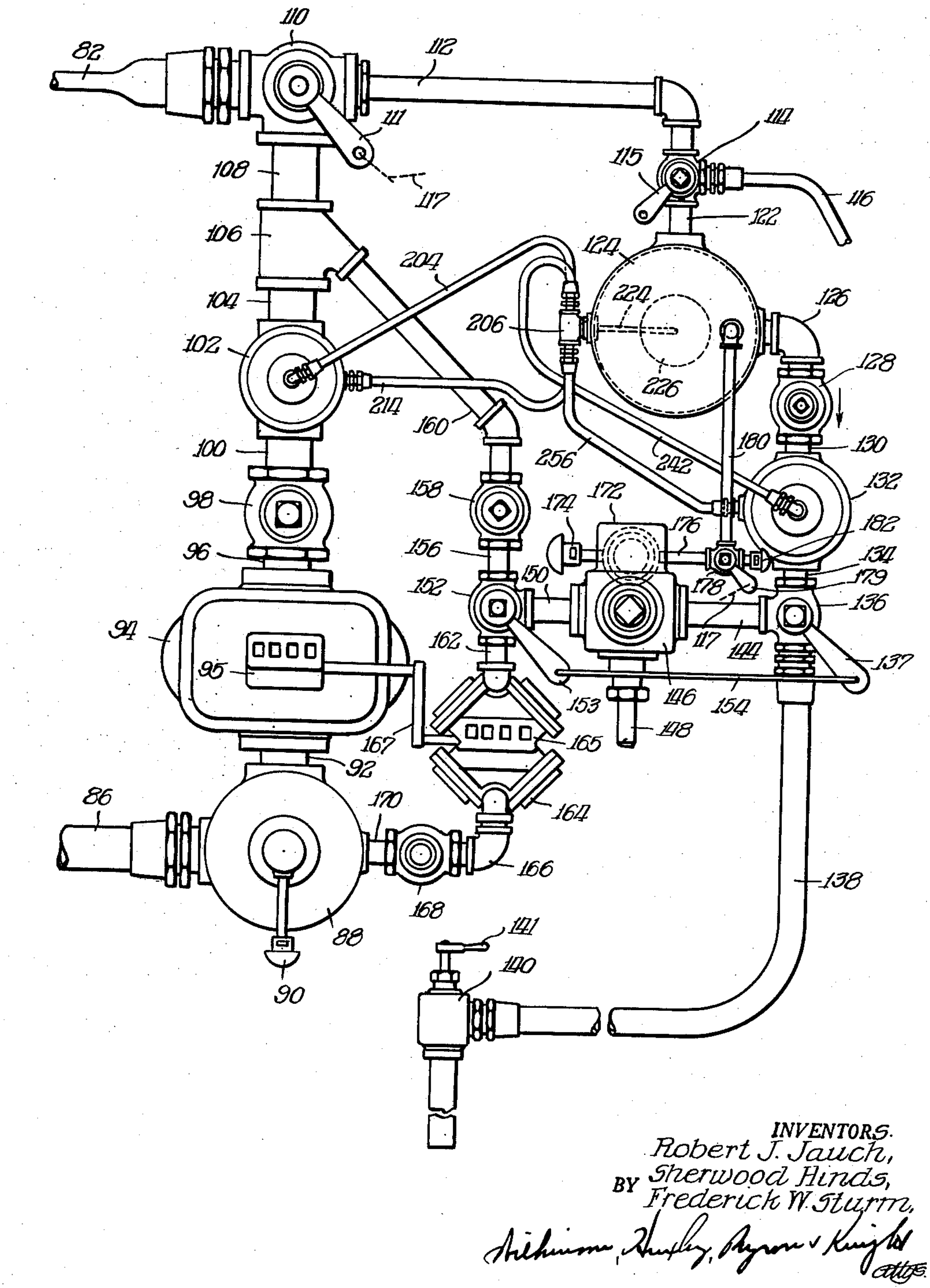
Figure 7 is a diagrammatic view of the piping of the modified form of dispensing apparatus shown in Figure 6.

Referring now to the dispensing mechanism 80 shown more particularly in Figures 6 and 7, the hose 74 is connected to the manifold 72 (Figures 1 to 3) and the manifold is connected to the pipe 86 (Figures 1, 3 and 7) which is connected to the air separator 88 provided with the air vent 90. It is, of course, understood that the usual air separator is used having suitable air release valve mechanism for venting to the atmosphere. The outlet side of the air separator is connected through pipe 92 to the inlet side of the meter 94, liquid passing through the meter causing suitable registration on register 95. The outlet side of the meter is connected through pipe 96 to the check valve 98 opening outwardly or away from the meter.

The outlet side of the check valve 98 is connected through pipe 100 to the differential valve 102. The outlet side of the differential valve is connected through pipe 104 to the Y fitting 106 which in turn is connected through the pipe 108 to the three-way valve 110, the valve 110 being connected to the flexible, collapsible hose 82 through which fuel is supplied to the plane tank. Valve 110 is controlled through handle 111 and is connected through pipe 112 to the three-way valve 114 to which is connected the evacuating hose 116. Valve 114 is controlled by handle 115 and the hose 116 is provided with a suitable fitting 118 (Figure 1) adapted to be connected to a complementary fitting 120 (Figures 1 and 3) provided on the outlet 36 for the purpose of removing all fuel between the valve 34 and the nozzle 76 after dispensing operation has been made.

The valve 114 is connected through the pipe 122 to the vacuum tank 124, the outlet side of the tank 124 being connected through pipe 126 to the check valve 128 opening away from the tank, and the outlet side of the check valve 128 is connected through the pipe 130 to the differential valve 132. The outlet side of the differential valve 132 is connected through pipe 134 to the three-way valve 136 controlled by handle 137. Valve 136 is connected to the withdrawal hose 138 provided with the manually controlled nozzle valve 140 having control handle 141, this hose and nozzle being for the purpose of removing fuel from the plane tank 50 in the event it is desired to remove such fuel as where weight must be compensated for by the removal of fuel. This is accomplished through a top fill opening 142 (Figure 1) of the plane tank and this removal hose is generally referred to as a trimming hose.

The valve 136 is connected through the pipe 144 to the inlet of pump 146. The pump 146 is operated by suitable means (not shown) connected to the power take-off 148, and the outlet side of the pump is connected through the pipe 150 to the three-way valve 152, the handle 153 of which, preferably, is connected through the link 154 with the handle 137 of the valve 136. The valve 152 is connected through the pipe 156 to the check valve 158, opening away from valve 152, and the outlet side of the check valve is connected through pipe 160 to the Y fitting 106. The three-way valve 152 is connected through pipe 162 to the inlet side of the small meter 164 having a register 165 adapted to register liquid passing through the meter, and the outlet side of the meter is connected through pipe 166 to the check valve 168 opening away from said meter, and the check valve in turn is connected through pipe 170 to the air separator 88. This connection 170 is conveniently made to the air separator but, of course, it is understood that it can be directly connected to the pipe 86.

The pump 146 is provided with the vacuumizing cylinder 172, said pump being shown in Patent No. 2,384,172, Jauch et al., granted September 4, 1945, and the exhaust from the pump 146 is through the vent 174. The inlet side of the vacuumizing cylinder 172 is connected through pipe 176 to the three-way valve 178 controlled by handle 179, said valve being connected through pipe 180 to the vacuum tank 124 and the valve is provided with the vent 182 to atmosphere.

The differential valve 102 is provided with the valve member 192 (Figure 6) urged toward closed position by means of the spring 194 and said valve is adapted to seat on the seat 196 for preventing flow through the valve 102. The valve 192 is provided with the valve stem 198 having a piston 200 thereon mounted for reciprocation in the cylinder 202. One end of pipe 204 is connected to the cylinder above the piston 200 and the opposite end thereof is connected to the control valve housing 206 below the valve 208 mounted therein. The spring 210 normally urges the valve 208 toward closed position on its seat 212.

One end of pipe 214 is connected to the housing 206 above the valve 208 and the opposite end thereof is connected as at 216 to the valve 102 below the valve 192. It is seen that piston 200 is provided with a small bleed port 218 and the valve stem 220 of valve 208 extends within the vacuum tank 124 and is adapted to be operated by one arm 222 of the pivoted lever 224. The float 226 is attached to said lever 224, and downward movement of the float causes the valve 208 to open. Valve 132 is provided with the valve member 228 adapted to be seated on its seat 230 for preventing flow through the valve 132, the valve 228 being urged toward closed position by means of the spring 232. The valve is provided with the valve stem 234 having the piston 236 mounted for reciprocation in the cylinder 238, the piston being provided with the small bleed 240.

The pipe 242 is connected to the cylinder above the piston at one end and is connected to the valve housing 206 below the valve 246, said valve being urged toward closed position on its seat 248 by means of the spring 250. The valve 246 is provided with the valve stem 252 extending into the vacuum tank 124 and adapted to be operated by the other arm 254 of the lever 224. One end of pipe 256 is connected to the housing 206 above the valve 246 and at the other end is connected at 258 to the housing 132 below the valve seat 230.

Assuming it is desired to fuel a plane, the vehicle 66 is driven to a point adjacent the plane and the hose 74 is connected through the nozzle 76 to the fitting 38, it being assumed that the valve 34 is closed. The vehicle may then be moved to a point adjacent the plane and the hose 82 is connected through fittings 84 and 52 to the fill pipe 54. Valve 34, of course, can be opened immediately after coupling at 76—38 and the switch 42 may be operated to actuate the pump 26. This may either be done before or after the connection at 84—52. Liquid is then supplied from the tank 20 to the hose 74 and through pipe 86 to the air separator 88 (Figure 7) where the vapor is eliminated and the solid liquid will pass through the meter 94 causing registration thereof on register 95. Liquid then passes through valve 102 to valve 110 which has been operated so as to direct liquid to the hose 82. Inasmuch as the float 226 is in lowered position, valve 208 will be open so that the same pressure, as is in the line from the meter to the hose, is supplied upon the top of the piston 200 through pipe 214 and pipe 204. There being less pressure in the hose 82 than in the line from the meter to the hose, the piston 200 will be moved to open the valve 192 whereby liquid can be supplied to the plane.

After the proper amount of fuel has been supplied to the fuel tank, it is desired to withdraw fuel from the fill pipe 54 and hose 82. In order to accomplish this, valve 110 must be operated to effect communication between hose 82 and the pipe 112. Valve 114 is operated so that there is a communication established between pipes 112 and 122. Tank 124 is empty at this time and valve 128 is closed toward the tank as it is a check valve. The vacuumizing pump 146 in the one instance is used to establish a vacuum at vacuum tank 124, or if the alternative method is used the engine or other means is used to establish a vacuum. Vacuum being established in the vacuum tank, liquid will be withdrawn from the pipe 54 and hose 82, collapsing said hose for easy handling and storage, and liquid will flow into the tank 124 causing the float 226 to rise, permitting valve 208 to close preventing operation of the valve 192. As the float rises, the arm 254 will open valve 246, thus there is trapped in the vacuum tank the volume of the fill tube 54 and hose 82.

When the next fueling operation takes place, in order that there be a proper measurement, the liquid exhausted from the hose must be reintroduced into the hose 82 and the tube 54 i. e. the hose 82 and tube 54 must be filled before registration takes place. On the next fueling the valve 178 (Figure 6) is open to the atmosphere destroying the vacuum in tank 124. Valves 136 and 152 are operated so that, insofar as they are concerned, communication is established from pipe 126 to the inlet of the pump 146, and from the outlet of the pump into the line 108 through line 160. This operation causes a differential in pressure above and below the valve 228, thereby causing the piston 236 to move to open the valve 228 whereby liquid can be withdrawn from the tank 124 and supplied to the pipe 108, it being understood, of course, that the valve 110 has by this time been operated to cause communication between pipe 108 and hose 82.

Valve 102 will not open until the liquid in tank 124 has been resupplied to the hose 82. When that condition exists, float 226 will be lowered closing valve 246 and opening valve 208 whereby valve 192 is closed and valve 102 is conditioned for opening which will take place, as already described, when liquid is supplied from the pump 26.

When it is desired to withdraw liquid, for example, from the tank 50 (Figure 1), the hose nozzle 140 (Figure 7) is applied to the top tank opening 142 and the valve thereof opened. Valves 136 and 152 are moved to the position where hose 138 is connected to the inlet side of the pump 146, and the outlet side of the pump is connected to the inlet side of meter 164, the liquid passing through the meter being registered and returned to the line 86 (separator 88 or line 28). At this time or before the connection 78—38 is broken, it is necessary to close valve 34 and to apply vacuum to the line 36 and to this end hose 116 is attached to the fitting 120, and the valve 114 is conditioned so that there is communication between the hose 116 and the vacuum tank 124. The connection 78—38 is now broken with the result that the vacuum in tank 124 applied by connection 120 and hose 118 draws the fuel standing in the part of the stub open to the atmosphere, up into tank 124, and the vacuum in the vacuum tank is permitted to evacuate the liquid in the pipe 36, it being understood, of course, that valve 34 is closed.

Figure 8:
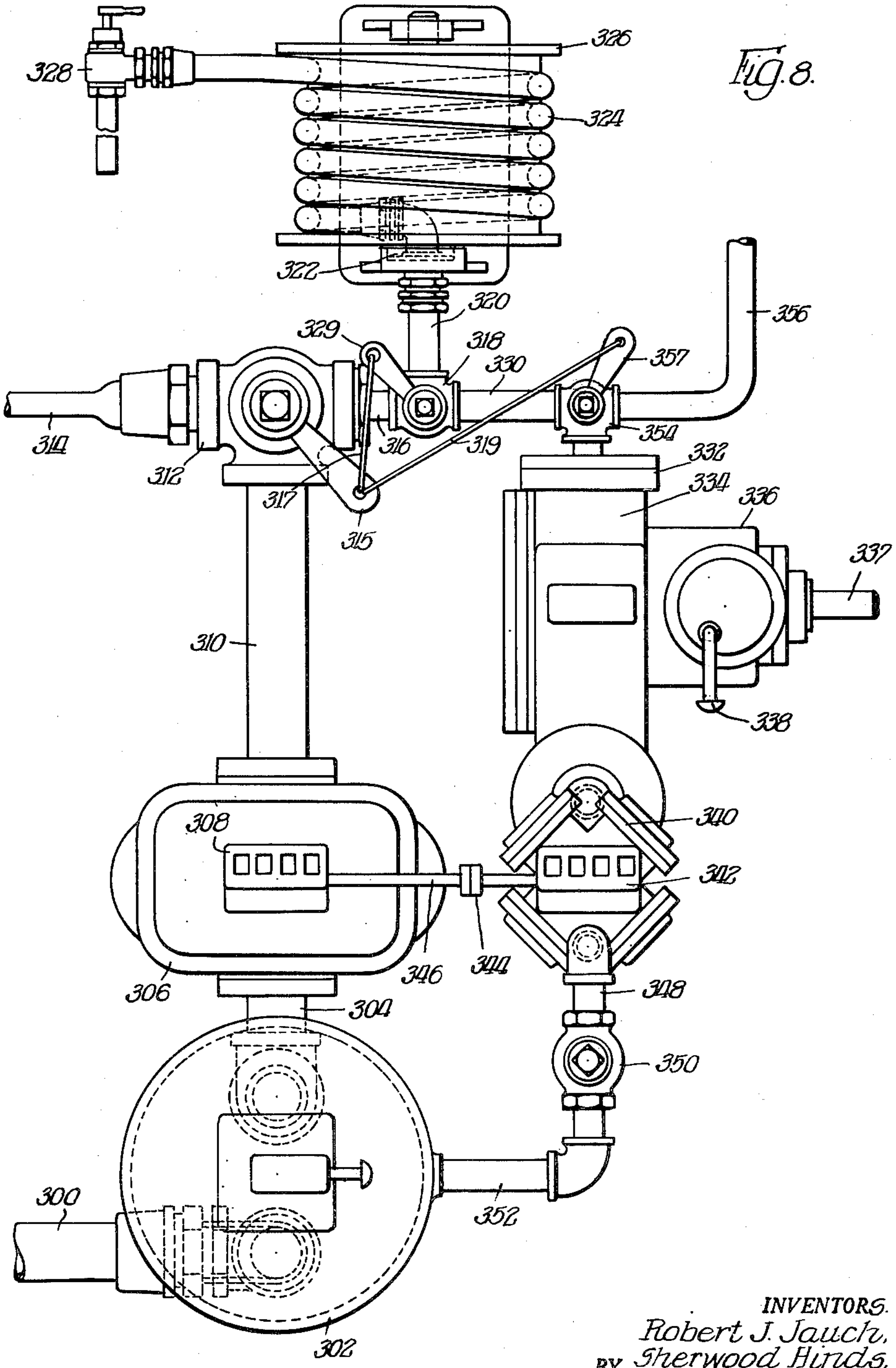

Referring now to the modification illustrated in Figure 8, the pipe 300 corresponding to pipe 86, is connected to the inlet side of air separator 302. The outlet side of the air separator is connected through the pipe 304 to the inlet side of the meter 306. The meter 306 is provided with the register 308, the meter actuating the register in accordance with the liquid passing therethrough. The outlet side of the meter is connected through the pipe 310 to the valve 312 which in turn is connected to the flexible, collapsible delivery hose 314 corresponding to the hose 82. The valve 312 is operated by handle 315 and is connected through pipe 316 to the valve 318 which in turn is connected through the pipe 320 to the manifold 322 of the wet hose 324, which is shown mounted on a reel 326, said hose corresponding to the hose 138 and being provided with the valve controlled nozzle 328. The valve 318 controlled by handle 329 is also connected through pipe 330 to the inlet side of the pump 332, the pump being preferably of the type such as shown in said Patent No. 2,384,172 wherein the pump is provided with a liquid pumping portion 334 and a vacuumizing portion 336 vented as at 338, the pump being driven through suitable means (not shown) through take-off 337.

The outlet side of the pump is connected to the inlet side of the meter 340, the meter being provided with the register 342 adapted to register the amount of the liquid passing therethrough, the register 342 being selectively connected to register 308 by a suitable clutch 344 and shaft 346 whereby when the clutch is in operative position and liquid is registering on the register 342, a comparable amount will be deducted from register 308. The outlet side of the meter 340 is connected through the pipe 348 and check valve 350 to pipe 352 which in turn is connected to the air separator and line 300 (or 28). Pipe 330 is provided with the three-way valve 354 to which is connected the hose 356 corresponding to hose 116, said valve being controlled by handle 357.

When it is desired to fuel a plane tank, connection is made to the underground connection as through the hose 74 (Figure 3) which in turn is connected through the reel to the pipe 300 (Figure 8). Liquid is supplied from the pump 26 into the air separator 302 where the vapor is eliminated and solid liquid is supplied into the inlet side of the meter 306 causing registry on the register 308. The clutch 344 being inoperative, no registry is caused on register 342. Liquid passes through the pipe 310 and valve 312 to the hose 314 and thence into the tank of the airplane.

After a suitable amount of liquid has been supplied to the tank, it is desired to evacuate the fill tube 54 and the hose 314 (which will cause it to collapse). Valve 312 is moved to establish communication between the hose 314 and pipe 330. It is understood that valve 318 permits liquid to flow from pipe 316 to pipe 330 but not into pipe 320. Valve 354 is conditioned so that liquid can flow into the inlet side of the pump but not into the hose 356. The pump 332 is operated to withdraw liquid from the hose 314 and fill tube 54 until the hose is dry and collapsed.

The liquid passes through meter 340 causing a registering operation on the meter 342 and a deducting operation on the register 308 and liquid passes from the meter 340 to the line 300. If, then, it is desired to evacuate the pipe 36 (Figure 3), the hose 356 (Figure 8) is connected to the fitting 120 (Figure 3) as in the case of the hose 116. Valve 354 may then be operated to establish connection between the hose 356 and the inlet side of the pump 332. When it is desired to withdraw liquid from the plane tank, nozzle 328 is inserted into the top of the tank with the valve open. Valve 312 is conditioned so that there is no communication between pipe 316, hose 314 or pipe 310. Valve 318 is in condition to connect pipe 320 to pipe 330 and valve 354 is moved to establish communication through pipe 330 with the inlet side of the pump. The clutch 344 may be operated so that no deduction will take place on the register 308 so that liquid withdrawn through the wet hose 324 is merely registered on the register 342 and returned to the pipe 300 (or 28).

Figure 9:
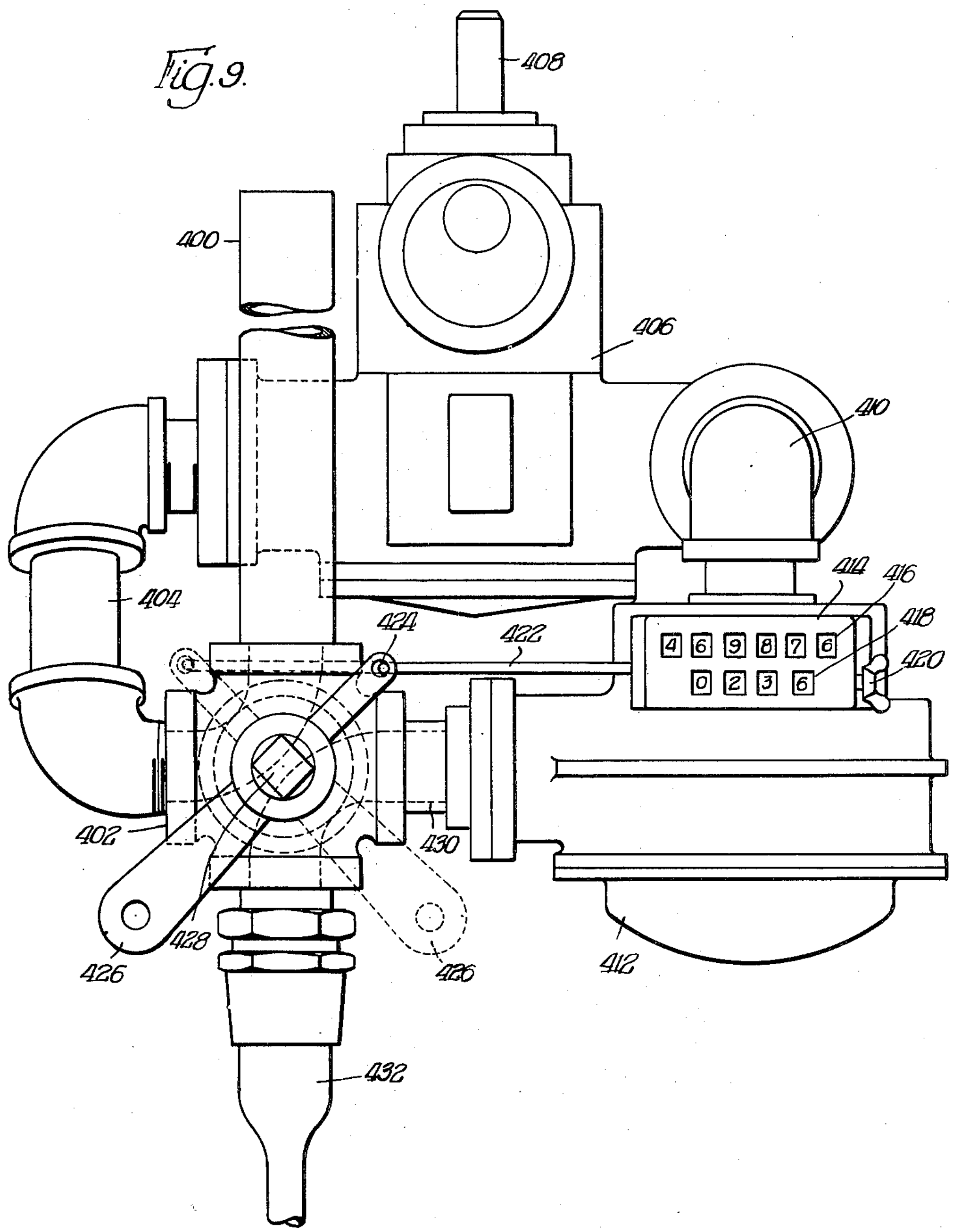

Referring now to the modification illustrated in Figure 9, the pipe 400 is adapted to be connected to a source of liquid supply and is connected to one side of the four-way valve 402. Another side of the four-way valve 402 is connected through piping 404 to the suction side of the pump 406, said pump being shown as of the type illustrated in said Patent No. 2,384,172, being driven by a suitable source of power connected to shaft 408. The outlet side of the pump is connected through piping 410 to the inlet side of the meter 412, liquid flowing through the meter serving to operate the counter or register 414.

The register shown is of the well-known Veeder type being provided with totalizer 416 and the individual service counter 418 which may be zeroized by the knob 420. The counter is of the reversible type which registers in a forward and reverse direction, the direction of registration being controlled by the rod 422, one end of said rod being connected as at 424 to an extension of handle 426, said handle being connected to the shaft 428 which controls the valve 402. The outlet side of the meter 412 is connected through the piping 430 to a third side of the four-way valve 402 and a fourth side of said valve is connected to the flexible, collapsible dispensing hose 432 which may be coiled or stored on a reel, or flat, as desired.

In the operation of this form of mechanism, assuming the pump to be in operation and the handle 426 in the full line position as indicated, and assuming the usual coupling or nozzle valve provided on the hose 432 to be open, liquid will flow through pipe 400, four-way valve 402, to the inlet side of the pump 406 through piping 404. It will then pass to the inlet side of the meter 412, through piping 410, and flowing through said meter will cause a dispensing registration on the totalizer 416 and the dispensing counter 418. The liquid will then pass through four-way valve 402 to the dispensing hose 432 where it may be delivered as desired.

After the filling operation has been effected, the handle 426 may be shifted to the dotted line position as shown in Figure 9. In this case, liquid will pass from the hose 432 through the four-way valve 402 and into the inlet side of the pump 406 through piping 404. Liquid will pass through the pump and through the meter 412 and as the handle 406 has been shifted, suitable control mechanism in the indicator 414 will operate said register in a reverse or subtracting direction. Liquid will then pass through the meter and through the four-way valve 402 back to the source of supply through pipe 400. The nozzle valve of the hose 432 having been closed, liquid will be exhausted from the hose 432 until it is dry and collapsed, and when the register has ceased registering, the hose will be dry, whereupon it may be stored.

Figure 10:
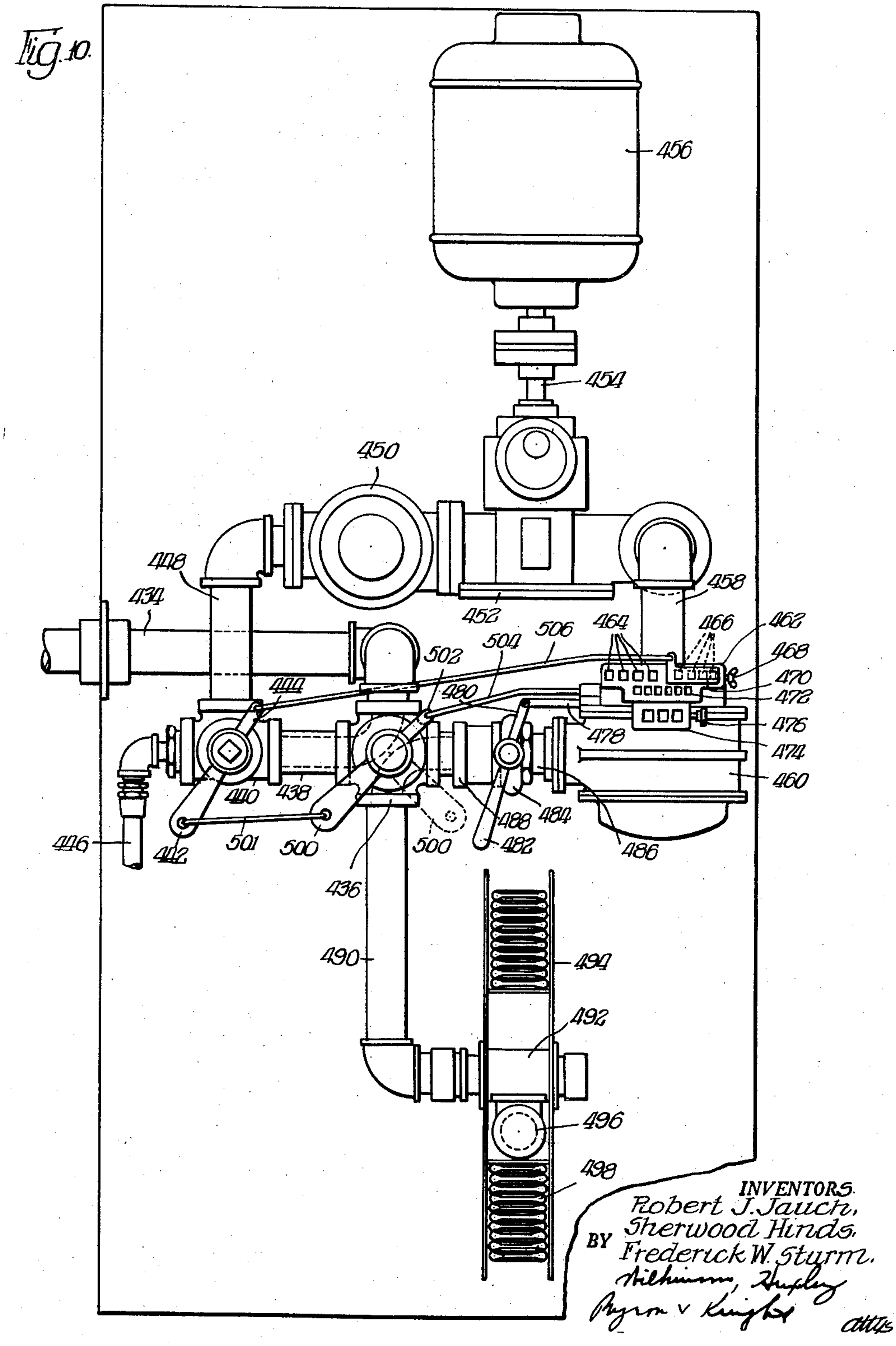

Referring now to the modification illustrated in Figure 10, the pipe 434 is adapted to be connected to a suitable source of supply, said pipe being connected to one side of the four-way valve 436. Another side of said four-way valve is connected through the piping 438 to one side of the three-way valve 440, said valve being controlled by the handle 442 provided with the lever 444. Another side of the valve 440 is connected to the plane trimming or withdrawal hose 446 which may be provided with a suitable nozzle not shown. The third side of the valve 440 is connected through the piping 448 to the inlet side of the strainer 450, the outlet side of the strainer being connected to the inlet side of the pump 452. Said pump is preferably of the type illustrated in said Patent No. 2,384,172, and is adapted to be driven through shaft 454 by suitable driving means, such as the motor 456 or may be from the vehicle motor, if the system is mounted on a vehicle.

The outlet side of the pump 452 is connected through the piping 458 to the inlet side of the meter 460, liquid passing through said meter being adapted to control the indicator or register 462. The register 462 is provided with a set of indicators 464, and another set of indicators 466 which are adapted to be operated in reversed direction to the indicators 462. Both are adapted to be zeroized simultaneously by the knob 468. A shield 470 is slidably provided on the counter and so disposed that when said shield exposes one set of indicators, for example, 464, it masks the other set, for example, 466. A set of non-resettable totalizers 472 are also provided, and a predetermining set of indicators (or counter) 474 are provided, settable by the knob 476 and operatively connected through the rod 478 to the lever 480 of the handle 482 which is adapted to control the valve 484.

The valve 484 is biased to closed position by a suitable spring mechanism but is latched open when the indicator 474 is set. When the indicator 474 reaches zero the latching mechanism thereof is released permitting the spring of valve 484 to close said valve. Of course, indicator 474 may not be used in which case the handle 482 may be manually opened and closed. The valve 484 is connected to the outlet side of the meter through pipe 486 and is connected through piping 488 to the third side of the four-way valve 436. The fourth side of valve 436 is connected through piping 490 to the inlet side of the manifold 492 of the reel 494. The outlet side of the manifold is connected as at 496 to one end of the flexible, collapsible hose 498 which is provided with a suitable nozzle valve at its other end. The four-way valve 436 is adapted to be operated by the handle 500, said handle being connected to handle 442 by rod 501 and being provided with the lever 502 which is pivotally connected to the rod 504 which controls suitable mechanism in the indicator for operating the indicators 464, 466 and 472, in a forward or reverse direction. The shield 470 is pivotally connected to one end of the rod 506 which is connected at the other end to the lever 444.

Assuming the handles 500 and 442 to be in the full line positions indicated in Figure 10, and it is desired to dispense through the hose 498 which has been withdrawn from the storage reel, operation of the pump 452 causes liquid to be drawn from the source of liquid supply through piping 434, passing through the four-way valve 436 and to the three-way valve 440, through piping 438. The three-way valve will be in position where the hose 446 is inoperative so liquid will pass to the suction side of the pump 452 through piping 448 and strainer 450. Liquid will pass to the inlet side of the meter 460, through piping 458 and thence through said meter.

The indicator or counter 474 will have been preset to a selected number of gallons to be dispensed, for example, 100 gallons, and the handle 482 will have been moved to open the valve 484 so that liquid will pass through said valve, through pipe 488, through valve 436, piping 490, to the dispensing hose 498, through which it may be dispensed. After the selected number of gallons has been dispensed, the totalizer 472 will indicate the total gallons dispensed through the meter and the indicator 464 will indicate the number of gallons dispensed at this time, for example, the 100 gallons, whereas, indicators 466, which are masked, will indicate 9900, being a subtracting counter in this position. Thereupon the counter 474 will operate to release the handle 482 and the spring will close the valve 484 rendering the device inoperative to serve.

In order to exhaust the liquid from the hose 498, the nozzle valve thereof will be closed. The handle 500 will be moved to the dotted line position and the pump will withdraw liquid from the hose through piping 490, four-way valve 436, piping 438, three-way valve 440, piping 448, through the pump 452 and piping 458 and through the meter 460. The handle 482 will have been latched to open position by a manual latch, not shown. When this latch is used, it is, of course, understood that the indicator 474 will be inoperative to automatically control the valve 484. Liquid will then pass through piping 486, valve 484, piping 488, valve 436, and through piping 434 to the source of supply. The handle 500 having been moved to the dotted line position will have moved the rod 504 to cause subtracting operation on the counter 472 and indicators 464 and an adding operation on the indicators 466 which are masked. If ten gallons are taken out of the hose, the indicators 464 will read 90 gallons, whereas, the masked indicators 466 will read 9910 gallons.

If now it is desired to trim the plane through hose 446, the indicators 464 and 466 are zeroized by knob 468. Handle 442 will have been moved to connect hose 446 to piping 448. Liquid then can pass from hose 446 to the inlet side of the pump 452 through piping 448. Liquid will then pass into the inlet side of the meter 460 through piping 458 and the liquid removed in passing through the meter will be indicated on the indicators 466 which have been unmasked and will be indicated in a subtracting direction on the indicators 464 which are now masked. While this trimming operation is being effected the totalizer 472 is subtracting due to the position of the handle 500. Liquid will then pass from the meter through the four-way valve 436 back to the source of supply.

Figure 11:
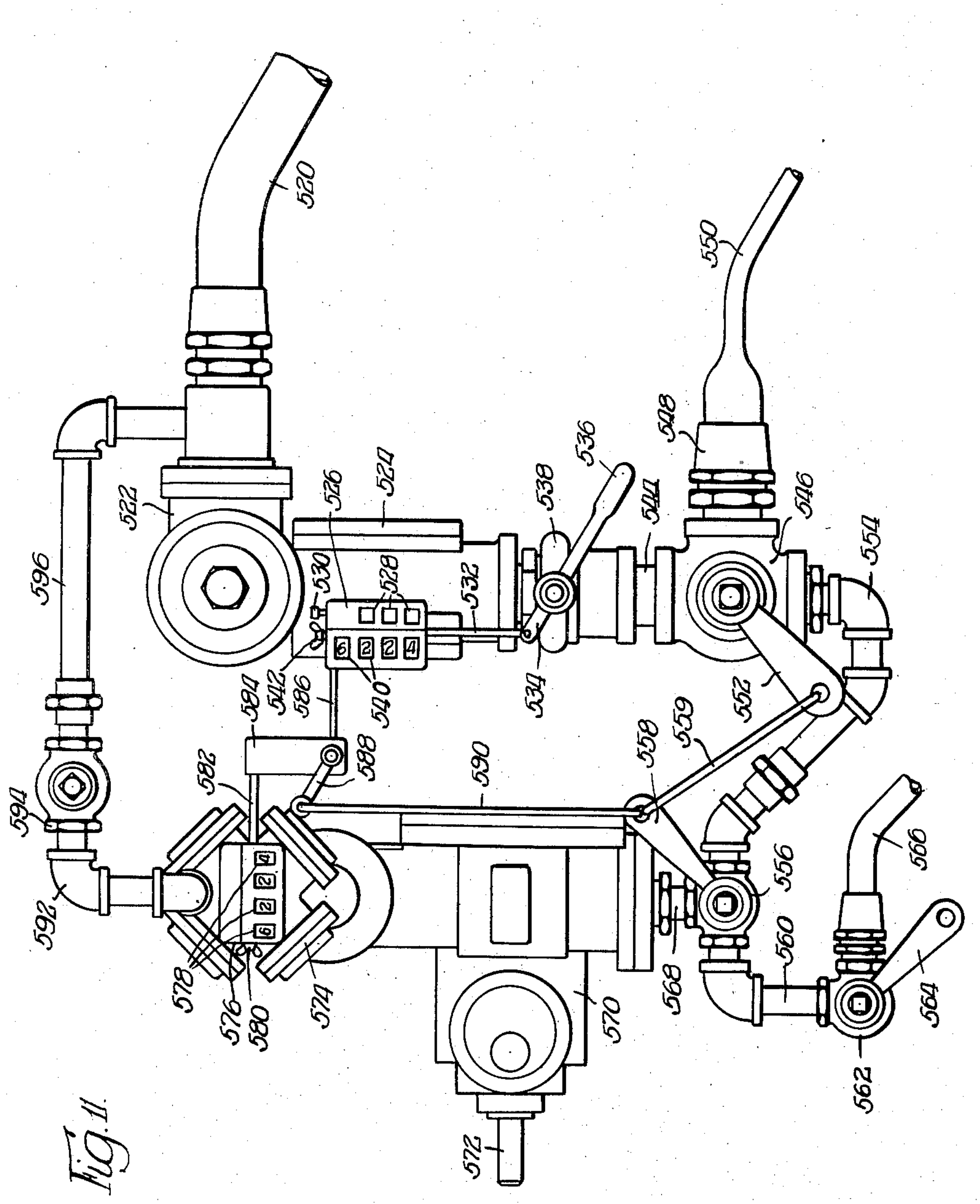

Referring now to the construction illustrated in Figure 11, it is understood that this system, as the others, may either be mounted on a vehicle or may be stationary. The system comprises a hose 520, which is similar to the hose 74 (Figure 3) being provided with a fitting (not shown) for connection to an outlet stub, such as the stub 36. The hose is connected through the air separator 522 to the inlet side of the meter 524, said meter being adapted to operate the indicator or register 526 which is a preset indicator having the preset indicators 528 settable by knob 530 and controlling the rod 532 pivoted to the lever 534 of the handle 536. Said handle 536 controls the automatic shut-off valve 538, the inlet side of which is connected to the outlet side of the meter. The meter and preset indicators are of usual types such that when the preset quantity of liquid has passed through the meter, the rod 532 is operated to close valve 536 and stop discharge of liquid. The movement of rod 532 will also serve to disconnect indicator 526 from the meter 524 so that the counter may be reversely driven when trimming or removing liquid as will be described hereafter. The indicator 526 also is provided with the indicators 540 for showing the amount of liquid passing through the meter, said indicators being adapted to be reset by the knob 542. The indicator may also include totalizers (not shown).

The outlet side of valve 538 is connected through the pipe 544 to one side of the three-way valve 546, the valve being connected through fitting 548 to the flexible, collapsible hose 550 provided with a suitable discharge nozzle (not shown). The three-way valve is provided with a control handle 552 and is connected through piping 554 to the three-way valve 556. The three-way valve 556 is controlled by the handle 558 and is connected through piping 560 to the shut-off valve 562.

The shut-off valve 562 is controlled by the handle 564 and is connected to the trimming or removal hose 566, provided with a suitable nozzle (not shown). The three-way valve 556 is connected through piping 568 to the inlet side of the pump 570 preferably similar to pump shown in said Patent No. 2,384,172, being driven through a shaft 572. The outlet side of the pump is connected to the inlet side of the meter 574, liquid passing through the meter operating the counter or register 576, said counter being provided with indicators 578 adapted to be zeroized by the knob 580. The counter 576 is adapted to drive a shaft 582 which drives suitable mechanism indicated at 584 which includes a clutch and differential means in turn operating a shaft 586 operatively connected to the indicator 526. The mechanism 584 is provided with a control lever 588 pivotally connected at one end to the rod 590 which in turn is pivotally connected at its other end to the handle 558. Registration on register 576 by virtue of liquid passing through meter 574 causes subtraction on the indicator 526.

The outlet side of the meter 576 is connected through piping 592 to the inlet side of the one way check valve 594 which permits the liquid to flow from pipe 592 to pipe 596 which in turn is connected to the source of liquid supply through the hose 520. The pressure supplied through hose 520 is less than the pressure supplied from the pump 570 to the meter 574.

When it is desired to fuel a plane, it being assumed that the hose 520 is connected to the suitable source of supply, the preset indicator 526 may be set by knob 530 causing a predetermined amount to be indicated by the indicator 528. Indicators 540 are zeroized as are indicators 578. The automatic shut-off valve 538 is latched open and valve 546 is disposed so that there is a connection between pipe 544 and said hose 550, the hose 550 being disposed to deliver gasoline either through a manually controlled nozzle or an automatic connection. Liquid then passes through the meter 524 causing a subtracting registration on the indicators 528 and an adding registration on the indicators 540. Liquid passes through the valve 538, pipe 544 and is supplied to the hose 550 through valve 546. After the predetermined amount of liquid has been supplied, indicators 528 will read zero, releasing the handle 536, causing the valve 538 to close.

When it is desired to vacuumize the hose as where the hose is to be disconnected or stored, the valve 546 is conditioned to connect the hose 550 to the pipe 554, valve 556 is conditioned to connect the pipe 554 to the inlet side of the pump 570 and in so doing the mechanism 584 is conditioned so that counters 576 and 526 are connected. Operation of the pump 570 causes liquid to flow from the hose 550 through valve 546, piping 554, valve 556 through pump 570 and through meter 574, where the indicators 578 indicate the amount of liquid passing through the meter. At the same time the connection through shafts 582, 586, and mechanism 584 causes subtracting on the indicators 540. The liquid then passes through piping 592, valve 594, pipe 596 into hose 520, where it is returned to the source of supply. The indicators 540 then show the exact amount of liquid actually delivered.

Similarly, if a plane is to be trimmed, as by removal of gasoline from a tank, the hose 566 is utilized and valve 562 is conditioned so that hose 566 is connected to pipe 568 through pipe 560 and valve 556. Valve 556 is conditioned so that pipe 560 is connected to the inlet side of the pump and there is still a connection through mechanism 584 so that addition on the indicators 578 causes subtraction on the indicators 540. Liquid then, as before, passes through the pump 570, meter 574, piping 592, valve 594, piping 596 to the hose 520, through which it passes to the source of supply.

In Figures 12 and 13 there is illustrated an adaptation of the invention to an airport which is indicated generally at 600. The airport is provided with the runway 602 for the planes 604. Adjacent the runway there may be provided pits 606 supplied from storage tanks 608 through the flow line 610. Fuel may be supplied to the tanks from a suitable pumping unit indicated generally at 612. Within the pits 606 a valve 614 is provided having a connecting fitting 616 thereon adapted to be connected to a hose 618 which is carried on a suitable reel 620 provided on the truck 622. This arrangement is similar to that described in Figures 1 to 5.

The truck 622 is provided with the system 624 which is similar to any of the systems hereinbefore described. In this case instead of the reel, such as reel 494 (Figure 10) being used, the dispensing hose 626 is shown coiled in dotted lines and in fueling position in full lines, and is shown adapted for bottom filling of the wing tank 628 of the plane. Of course the hose may be provided with a nozzle which is manually controlled for top filling.

A defueling hose 630 shown in dotted lines for operative position and in full lines in stored position, is adapted to be connected through a suitable valve 632 to the pump suction as heretofore previously described, the defueling liquid passing through the meter and being deducted from the registration thereon. The mechanism contemplated herein may be stored in cabinets 634, likewise supplied from the line 610 in which case the hose 626 may be run directly to the plane as shown in Figure 12. It may not be necessary to use a reel with the fueling hose 626, as the hose 618 may be connected as at 616 and then the truck driven to the plane to be fueled so that only a short length of hose 626 may be necessary to be handled, in which case it may only be necessary to stack the hose and not reel it.

The operation of the specific system for fueling and defueling will depend on which of the systems described herein are used, as have already been described in detail.

In various of the modifications shown herein reference has been made to a reversible register, such a register being shown and described in application Serial No. 612,233, filed by Sherwood Hinds on August 23, 1945 for Airport Fueling Mechanism, now Patent No. 2,556,425, issued June 12, 1951.

In various modifications, it is to be pointed out that the handles of the various valves may be interlocked. In Figures 6 and 7, the handles 153 and 137 may or may not be interlocked as by rod 154, and handles 111 and 179 may or may not be interlocked as by rods 117. In Figure 8 handles 315, 329 and 357 or any two of them may or may not be interlocked by rods 317 or 319. In Figure 10, handles 442 and 500 may or may not be interlocked as by rod 501. In Figure 11 handles 552 and 558 may or may not be interlocked by rod 559, and handle 564 may be interlocked (not shown) or may be omitted as may any of the trimming hoses and their connections. Also where two meters and indicators are used they may be provided with mechanism as 584 in Figure 11, 344 in Figure 8 and 167 in Figure 7 to cause subtracting on the meter affected by dispensing through the collapsible hose when the hose is being evacuated.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In liquid dispensing apparatus, the combination of a flow line adapted to be connected to a source of liquid supply, a meter, the inlet side of which is connected to said source, a check valve opening away from said meter connected to the outlet of said meter, a differential valve having an inlet connected to the outlet of said check valve, a dispensing line connected to the outlet of said differential valve, a dispensing hose connected to the outlet of said dispensing line, a vacuum tank, a connection to said vacuum tank, a three-way valve connecting said connection, said hose and said dispensing line operable to connect said dispensing line to said hose or to connect said hose to said connection, an outlet connection from said vacuum tank, a check valve in said outlet connection opening away from said vacuum tank, a second differential valve having an inlet connected to said outlet connection, means associated with said vacuum tank and said differential valves for closing one valve when the other is opened, a pump having an inlet connected to the outlet of the second differential valve and having vacuumizing means connected to said vacuum tank, a connection between the outlet of said pump and said dispensing line, and a connection between the outlet of said pump and said source, a valve between said last named connections controlling flow to either one or the other, and a check valve between said last named valve and said dispensing line opening away from said valve.

2. In liquid dispensing apparatus, the combination of a flow line adapted to be connected to a source of liquid supply, a meter the inlet side of which is connected to said source, a check valve opening away from said meter connected to the outlet of said meter, a differential valve having an inlet connected to the outlet of said check valve, a dispensing line connected to the outlet of said differential valve, a dispensing hose connected to the outlet of said dispensing line, a vacuum tank, a connection to said vacuum tank, a three-way valve connecting said connection, said hose and said dispensing line operable to connect said dispensing line to said hose or to connect said hose to said connection, an outlet connection from said vacuum tank, a check valve in said outlet connection opening away from said vacuum tank, a second differential valve having an inlet connected to said outlet connection, means associated with said vacuum tank and said differential valves for closing one valve when the other is opened, a pump having an inlet connected to the outlet of the second differential valve and having vacuumizing means connected to said vacuum tank, a valve between said vacuum means and vacuum tank interlocked with said three-way valve whereby operation of said three-way valve to connect said hose and connection operates said last named valve to connect said vacuum tank and vacuum means, a connection between the outlet of said pump and said dispensing line, and a connection between the outlet of said pump and said source, a valve between said last named connections controlling flow to either one or the other, and a check valve between said last named valve and said dispensing line opening away from said valve.

3. In liquid dispensing apparatus, the combination of a flow line adapted to be connected to a source of liquid supply, a meter the inlet side of which is connected to said source, the outlet side of said meter being connected to the flow line, a register operated by said meter in accordance with liquid passing through said meter, a dispensing hose, a pump, a three-way valve connected to the hose, to the outlet of said meter and the inlet of said pump, said valve being operable to connect the meter outlet to the hose or the hose to the pump inlet, a second meter having an inlet connected to the outlet of said pump, the outlet of said meter being connected to the source, a check valve interposed between said second meter and source and opening toward said source, a register operated in accordance with liquid passing through said second named meter, and connection between said registers whereby registering of said second named register causes a like subtraction from said first named register.

4. In liquid dispensing apparatus, the combination of a flow line adapted to be connected to a source of liquid supply, a meter the inlet side of which is connected to said source, the outlet side of said meter being connected to the flow line, the source of supply including a valve controlled connection stub, a register operated by said meter in accordance with liquid passing through said meter, a dispensing hose, a pump, a three-way valve connected to the hose, to the outlet of said meter and the inlet of said pump, said valve being operable to connect the meter outlet to the hose or the hose to the pump inlet, a second meter having an inlet connected to the outlet of said pump, the outlet of said meter being connected to the source, a check valve interposed between said second meter and source and opening toward said source, a register operated in accordance with liquid passing through said second named meter, a connection between said registers whereby registering of said second named register causes a like subtraction from said first named register, a connection to said stub for withdrawing liquid therefrom, a three-way valve between said pump suction and said last named connection and between said first named three-way valve and pump suction for connecting said connection to the pump suction and simultaneously disconnecting said first named three-way valve and pump suction.

5. In liquid dispensing apparatus, the combination of a flow line adapted to be connected to a source of liquid supply, a meter the inlet side of which is connected to said source, the outlet side of said meter being connected to the flow line, the source of supply including a valve controlled connection stub, a register operated by said meter in accordance with liquid passing through said meter, a dispensing hose, a pump, a three-way valve connected to the hose, to the outlet of said meter and the inlet of said pump, said valve being operable to connect the meter outlet to the hose or the hose to the pump inlet, a second meter having an inlet connected to the outlet of said pump, the outlet of said meter being connected to the source, a check valve interposed between said second meter and source and opening toward said source, a register operated in accordance with liquid passing through said second named meter, a connection between said registers whereby registering of said second named register causes a like subtraction from said first named register, a connection to said stub for withdrawing liquid therefrom, a three-way valve between said pump suction and said last named connection and between said first named three-way valve and pump suction for connecting said connection to the pump suction and simultaneously disconnecting said first named three-way valve and pump suction, and means between said three-way valves whereby operation of one controls operation of the other.

6. In liquid dispensing apparatus, the combination of a supply line adapted to be connected to a source of liquid supply, a meter the inlet side of which is connected to said source, an automatic shut-off valve biased toward closed position having an inlet connected to the meter outlet, a three-way valve having one side connected to the shut-off valve outlet, a second side of said three-way valve being connected to a flexible, collapsible dispensing hose, another three-way valve having one side connected to the third side of said first named three-way valve, a pump having an inlet connected to a second side of said second named three-way valve, a trimming hose connected to the third side of said second named three-way valve, a second meter having an inlet connected to the pump outlet, a check valve opening away from the outlet of said second named meter connected to said meter outlet, the outlet of said check valve being connected to said source, said first named meter having a register including a preset indicator connected to said shut-off valve whereby said shut-off valve is shut when said preset meter reaches a predetermined indication, said register also including a resettable reversible indicator operable in one direction to show the amount of liquid passing through said first named meter, said second named meter having a register for showing the amount of liquid passing through said second named meter, means between said registers operable to cause subtracting from said first meter in the same amount as said second meter adds, control mechanism between said second named three-way valve and said means for causing said means to be operative when said second named three-way valve is operative to permit liquid to pass through said pump, and an interlock between said three-way valves, whereby said second three-way valve is inoperative when liquid is being dispensed from said dispensing hose, but operative so liquid can pass from said dispensing hose to said pump.

7. In liquid dispensing apparatus, the combination of a flow line adapted to be connected to a source of liquid supply, a meter the inlet side of which is connected to said flow line, a check valve opening away from said meter connected to the outlet of said meter, a differential valve having an inlet connected to the outlet of said check valve, a dispensing hose connected to the outlet of said differential valve, a tank for receiving liquid from said hose whereby said hose is evacuated, a valve interposed between said hose and differential valve for controlling flow to said hose and from said hose to said tank, and means for controlling said differential valve, said means including a control associated with said tank and affected by the liquid content of said tank.

8. In liquid dispensing apparatus, the combination of a flow line adapted to be connected to a source of liquid supply, a meter the inlet side of which is connected to said flow line, a differential valve having an inlet connected to the outlet of said meter, a dispensing hose connected to the outlet of said differential valve, a tank for receiving liquid from said hose whereby said hose is evacuated, and means for controlling said differential valve, said means including a control associated with said tank and affected by the liquid content of said tank.

9. In liquid dispensing apparatus, the combination of a flow line adapted to be connected to a source of liquid supply, a meter the inlet side of which is connected to said flow line, a differential valve having an inlet connected to the outlet of said meter, a dispensing hose connected to the outlet of said differential valve, a tank for receiving liquid from said hose whereby said hose is evacuated, a valve interposed between said hose and differential valve for controlling flow to said hose and from said hose to said tank, and means for controlling said differential valve, said means including a control associated with said tank and affected by the liquid content of said tank.

ROBERT J. JAUCH.
SHERWOOD HINDS.
FREDERICK W. STURM.

REFERENCES CITED

The following references are of record in the file of this patent:

UNITED STATES PATENTS

| Number | Name | Date |
|---|---|---|
| 1,023,141 | Eisenbise | Apr. 16, 1912 |
| 1,756,410 | Hertz | Apr. 29, 1930 |
| 1,914,021 | Jester | June 13, 1933 |
| 2,017,345 | Granberg | Oct. 15, 1935 |
| 2,160,741 | Jensen | May 30, 1939 |
| 2,362,559 | Jauch et al. | Nov. 14, 1944 |
| 2,507,597 | Holdridge | May 16, 1950 |